United States Patent [19]

Ohwada et al.

[11] Patent Number: 4,583,122
[45] Date of Patent: Apr. 15, 1986

[54] IMAGING DISPLAY DEVICE

[75] Inventors: Junichi Ohwada, Hitachi; Hideaki Kawakami, Mito; Makoto Matsui, Kunitachi; Eiichi Maruyama, Kodaira, all of Japan

[73] Assignee: Hitachi, Ltd., Tokyo, Japan

[21] Appl. No.: 498,134

[22] Filed: May 25, 1983

[30] Foreign Application Priority Data

Jun. 2, 1982 [JP]  Japan ................................. 57-93195

[51] Int. Cl.$^4$ ............................................. H04N 5/26
[52] U.S. Cl. .................................... 358/213; 358/224; 354/219
[58] Field of Search ....................... 358/212, 213, 224; 354/219

[56]  References Cited

U.S. PATENT DOCUMENTS 4,217,608  8/1980  MacGregor ......................... 358/212
4,303,322  12/1981 Someya ............................... 354/219
4,496,981  1/1985  Ota ....................................... 358/224

OTHER PUBLICATIONS

W. Knorr, "Kompaktkamera . . . ", *Grundig Technische Information*, Mar. 1977, pp. 139–143.

*Primary Examiner*—Gene Z. Rubinson
*Assistant Examiner*—L. C. Schroeder
*Attorney, Agent, or Firm*—Antonelli, Terry & Wands

[57] ABSTRACT

An imaging display device characterized by comprising a pair of transparent substrates which are arranged in opposition to each other with a predetermined interval therebetween, photoelectric elements which are disposed in a large number between the substrates and in adjacency to one of the substrates and which convert light signals from outside the one substrate into electric signals, and a large number of electrooptic elements which are disposed between the other substrate and the respective photoelectric elements and in a predetermined relationship of correspondence with the photoelectric elements and which generate light signals by utilizing parts of the electric signals of the corresponding photoelectric elements.

7 Claims, 15 Drawing Figures

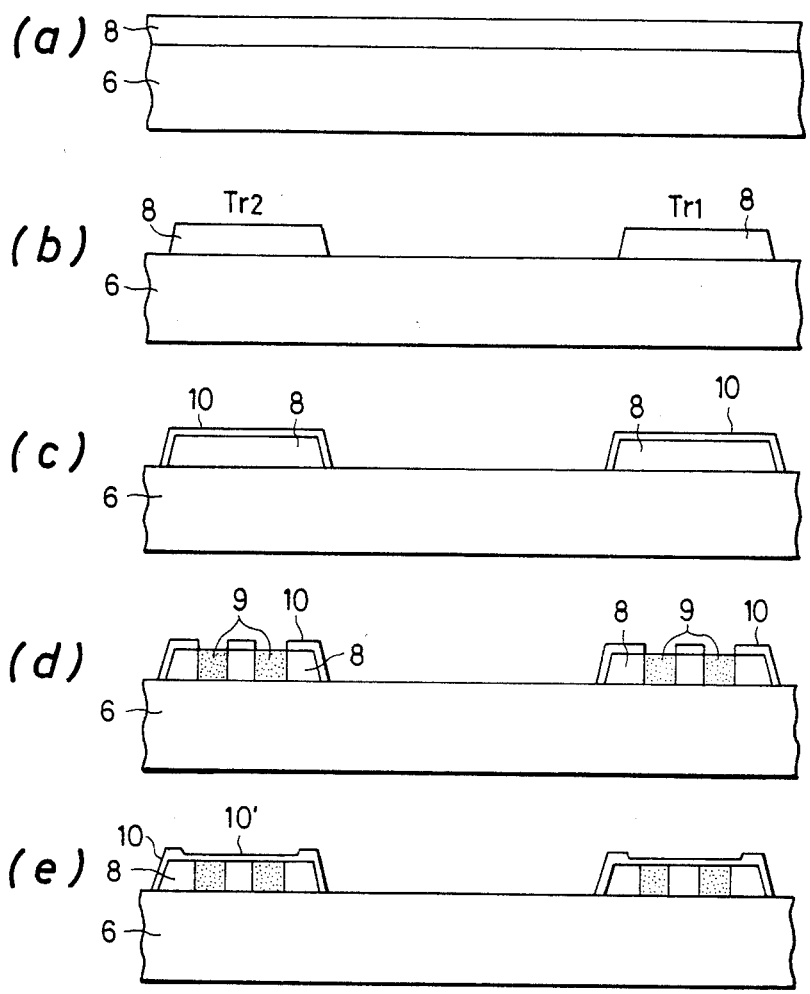

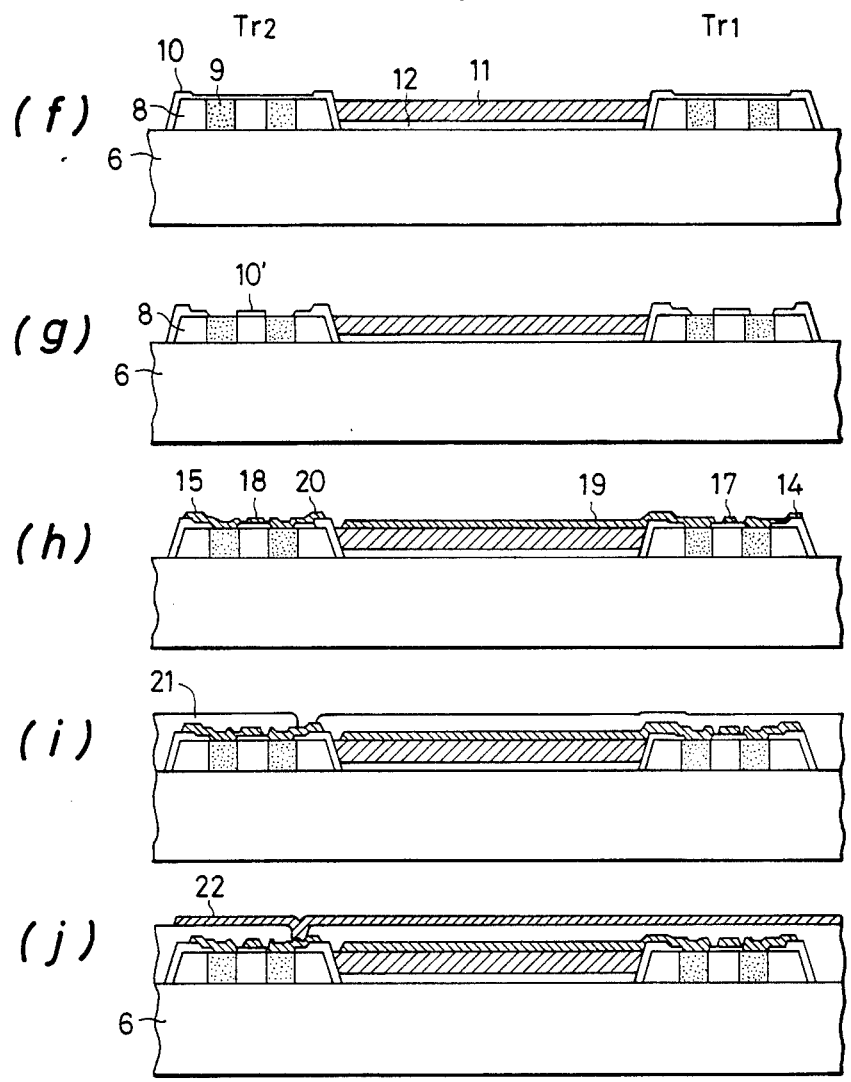

IMAGING DISPLAY DEVICE

BACKGROUND OF THE INVENTION

The present invention relates to an imaging display device, and more particularly to the consolidation in an imaging display device between an imaging portion for converting a light signal into an electrical picture signal and a picture display portion for converting the electrical picture signal into a picture.

Heretofore, an imaging device such as a camera for a video tape recorder has structurally included a portion for converting a light signal into an electrical picture signal and a portion for displaying the electrical picture signal. Used as the former is an image pickup tube which utilizes cadmium selenide (CdSe), amorphous silicon or the like, an imaging device in which MOS transistors and photodiodes or phototransistors are combined, or an imaging device which employs charge coupled devices (CCDs). The latter serves to monitor a picture under imaging or a picture recorded in the VTR, and an electron beam cathode-ray tube (CRT) is chiefly used therefor. In recent years, the LSI implementation of electronic circuits, improvements in a magnetic recording system, etc. have been made in order to render the whole device small in size and light in weight. Regarding the camera, however, in spite of endeavors for the miniaturization of the CRT for monitoring the picture, it is the present situation that the miniaturization of the whole camera is difficult due to the essential structure of the CRT.

Here, a miniaturized and thinned display device can be constructed as a monitoring picture display device by applying an electrooptic material such as liquid crystal and electroluminescent or electrochromic material. Even in this case, it results in a large occupying volume to separately prepare the picture display device and the imaging device and to build them into the camera. Further, a peripheral circuit such as driver circuit, and wiring leads for connecting elements are required, so that the miniaturization of the device cannot be expected much.

To the end of solving such problems, a liquid crystal display device disclosed in Japanese Laid-open Patent Application No. 56-85792 has been proposed in which a liquid crystal layer is held between substrates, and one of the substrates is formed with photosensitive elements, thereby to permit inputting/outputting with a pen.

The prior-art example has its usage limited to the inputting/outputting with the pen, and cannot be used as the monitor of the imaging device. More specifically, in constructing the imaging portion and the picture display portion on an identical device, there are required two systems of light; light which enters the imaging portion from a subject to be imaged, and light with which an imaging person looks at the picture display portion in order to monitor the picture. In the prior-art example, such two systems of light incide on and reflect from only one surface of the substrate. Therefore, the proposed device cannot be used as the monitor of the imaging device.

Another problem concerns the fact that one picture element is composed of an imaging part and a picture display part. When it is intended to execute the imaging and the picture display part with only one surface of the substrate, both parts share the areas of picture elements, and the effective areas of the imaging portion and the picture display portion become small.

SUMMARY OF THE INVENTION

An object of the present invention is to eliminate the disadvantages mentioned above, and to provide an imaging display device in which picture elements are formed by a pair of substrates with an imaging portion and a picture display portion consolidated, thereby to reduce peripheral circuits and wiring leads, so the device is well-suited to the miniaturization thereof.

In order to construct an imaging portion and a picture display portion on an identical device as described above, there are required two systems of light; light which enters the imaging portion from a subject to be imaged, and light with which an imaging person looks at the picture display portion in order to monitor a picture. In order to effectively furnish the device with such functions, both the surfaces of a flat type device may be respectively endowed with the two functions, namely, imaging and picture display. The present invention has been made with note taken of the fact that thin-film transistors can be fabricated on a glass or quartz substrate which is transparent.

The present invention is characterized by comprising a pair of transparent substrates which are arranged in opposition to each other with a predetermined interval therebetween, photoelectric elements which are disposed in a large number between the substrates and in adjacency to one of the substrates and which convert light signals from outside the one substrate into electric signals, and a large number of electrooptic elements which are disposed between the other substrate and the respective photoelectric elements and in a predetermined relationship of correspondence with the photoelectric elements and which generate light signals by utilizing parts of the electric signals of the corresponding photoelectric elements.

Other objects and characterizing features of the present invention will become apparent from the following description of embodiments.

BRIEF DESCRIPTION OF THE DRAWINGS

FIGS. 4(a) to 4(j) are sectional views showing a process for manufacturing an embodiment of the present invention;

DETAILED DESCRIPTION OF THE INVENTION

Now, the present invention will be concretely described in conjunction with embodiments.

Figure 1:
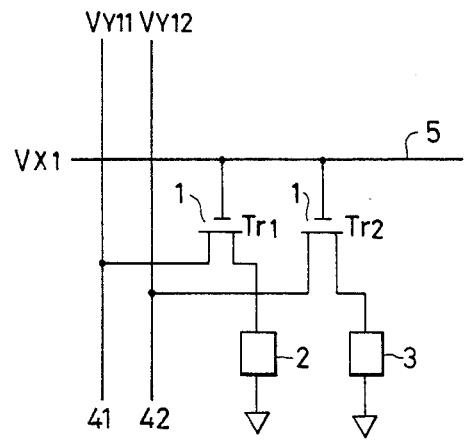
FIG. 1 is a block diagram showing the fundamental circuit arrangement of a single picture element of an imaging display device according to the present invention.

FIG. 1 is a block diagram which shows the fundamental circuit arrangement of a single picture element of an imaging display device according to the present invention.

Referring to FIG. 1, numeral 1 designates electronic switching elements which are made of thin-film transistors $Tr_1$ and $Tr_2$. Numeral 2 designates a photoelectric element which converts a light signal into an electric signal by utilizing the photovoltaic effect or photoconductive effect, for example, a CCD, BBD, photoconductor, photodiode, phototransistor, MOS transistor or MOS capacitor. Numeral 3 designates an electrooptic element which converts an electric signal into a light signal, such as the change of light transmission and the change of a color tone, by utilizing the electrooptic effect of liquid crystal, electrochromic, electroluminescence or the like. Numerals 41 and 42 designate signal lines, and numeral 5 designates a scanning line.

The signal line 41 for delivering imaged light information as a picture output signal $V_{y11}$ is connected to the drain of the thin-film transistor $Tr_1$, while the signal line 42 for applying a picture display signal $V_{y12}$ to a display portion is connected to that of the thin-film transistor $Tr_2$. The scanning line 5 for impressing scanning pulses $V_{x1}$ in tune with externally applied clock pulses and thus scanning respective picture elements in point sequence or line sequence is connected to the gates of the thin-film transistors $Tr_1$ and $Tr_2$. Since, in the present embodiment, the imaging portion and the picture display portion are incorporated, the scanning line 5 can be used in common. It is permitted to simultaneously detect and display a picture when a matrix is formed by combining a large number of picture elements as shown in FIG. 1.

Here, FIG. 1 illustrates the fundamental arrangement which is the simplest. The circuit may be arranged by adding a capacitor for affording the storage effect, a capacitor for holding a voltage, or a plurality of thin-film transistors for amplifying voltages, as is needed.

It is not the necessary condition of the present invention that the photoelectric elements and the electrooptic elements form the picture elements in 1-to-1 correspondence, namely the device may be driven by thinning out the electrooptic elements in such a manner that one electrooptic element corresponds to a plurality of photoelectric elements. That is, it is only required that the photoelectric elements and the electrooptic elements have a predetermined relationship of correspondence.

Figure 2:
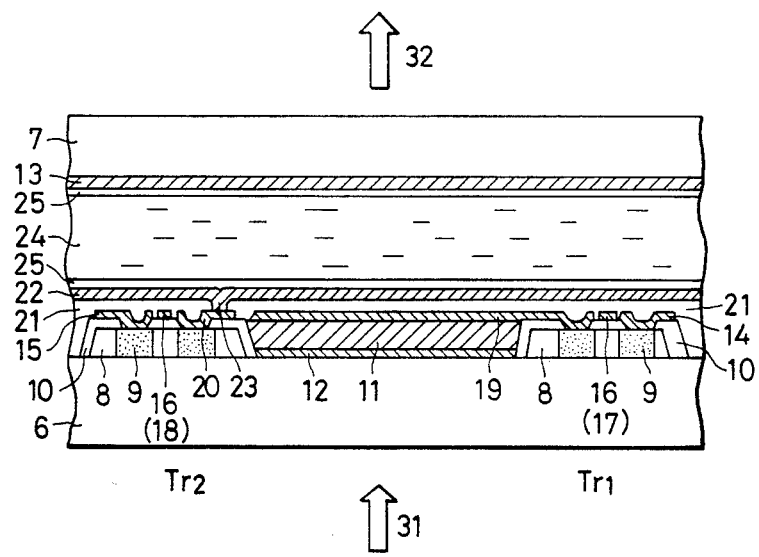
FIG. 2 is a sectional view showing an embodiment of the single picture element depicted in FIG. 1.
Figure 3:
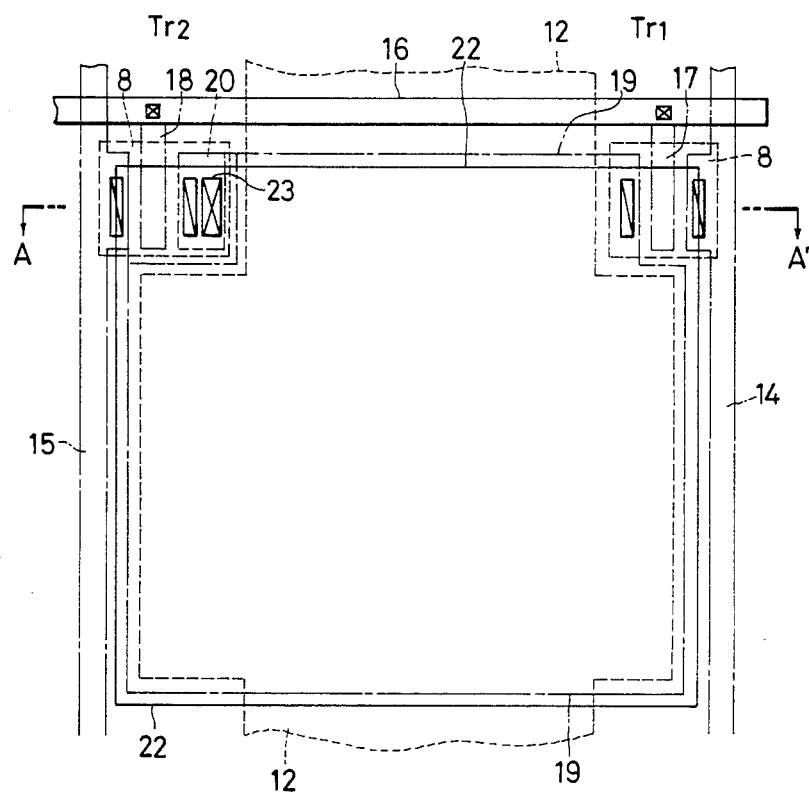
FIG. 3 is a plan view of one of substrates in FIG. 2.

A sectional view illustrative of an embodiment of the single picture element depicted in FIG. 1 is shown in FIG. 2, and a plan view of one transparent substrate 6 in FIG. 2 is shown in FIG. 3. FIG. 2 corresponds to a section A—A' in FIG. 3.

Numerals 6 and 7 indicate transparent substrates of glass, quartz, plastics or the like. Numeral 8 indicates a polycrystalline silicon thin film which is 0.5–1.5 μm thick, numeral 9 highly doped regions which serve as the sources and drains of the thin-film transistors $Tr_1$ and $Tr_2$, numeral 10 a silicon oxide film, and numeral 11 a hydrogenated amorphous silicon or the like photoconductor which serves as the photoelectric element. Numerals 12 and 13 indicate transparent electrodes of, e.g., $In_2O_3$, $SnO_2$ or a mixture thereof. Numeral 14 denotes a first signal electrode of Al or the like which corresponds to the signal line 41 in FIG. 1 and which is connected with the drain of the imaging thin-film transistor $Tr_1$, numeral 15 a second signal electrode of Al or the like which corresponds to the signal line 42 in FIG. 1 and which is connected with the drain of the picture displaying thin-film transistor $Tr_2$, and numeral 16 a scanning electrode of Al or the like which corresponds to the scanning line 5 in FIG. 1 and which is connected with both the gate electrode 17 of the imaging thin-film transistor $Tr_1$ and the gate electrode 18 of the picture displaying thin-film transistor $Tr_2$. Numeral 19 denotes the source electrode of the imaging thin-film transistor $Tr_1$, and numeral 20 that of the picture displaying thin-film transistor $Tr_2$. Numeral 21 represents an insulator film of phosphosilicate glass, silicon oxide, organic resin or the like, numeral 22 a metal electrode which is connected to the source electrode 20 of the picture displaying thin-film transistor $Tr_2$ through a contact hole 23 provided in the insulator film 21, numeral 24 a liquid crystal layer of the dynamic scattering mode (DSM), the twisted nematic mode (TN), the guest-host type or the like, and numeral 25 an orientation film of silicon oxide, organic resin or the like which orients the liquid crystal 24 in a predetermined direction.

In FIG. 2, light 31 incident from a subject to-be-imaged passes through the transparent substrate 6 and is converted by the photoconductor 11 into an electric signal, which is delivered as the picture output signal $V_{y11}$ when the thin-film transistor $Tr_1$ has turned ON. On the other hand, the picture display signal $V_{y12}$ is applied to the liquid crystal layer 24 from the metal electrode 22 having also the function of a reflector plate, when the thin-film transistor $Tr_2$ has turned ON. The variation of light 32 at this time is recognized as the picture through the transparent substrate 7 by an observer.

Next, the manufacturing process of the embodiment of the present invention shown in FIGS. 2 and 3 is illustrated in FIGS. 4(a)–4(j).

(FIG. 4(a))

On the major surface of a transparent substrate 6 of glass, quartz, plastics or the like, a polycrystalline silicon thin film 8 is grown to a thickness of 0.5–1.5 μm by a known method such as the chemical vapor deposition and the vacuum evaporation. When the thin film is formed or after it has been formed, a p-type element such as boron and indium is added as a dopant.

(FIG. 4(b))

The polycrystalline silicon thin film 8 is etched and removed by a known method so as to leave parts required for forming thin-film transistors $Tr_1$ and $Tr_2$.

(FIG. 4(c))

A silicon oxide film 10 is formed on the surface of the polycrystalline silicon thin film 8. In a case where the transparent substrate 6 is one of excellent heat resistance, such as of quartz, the silicon oxide film 10 is formed by performing a thermal oxidation treatment. On the other hand, in a case where the transparent substrate is glass or the like, the silicon oxide film 10 is formed by a low temperature treatment such as plasma oxidation, chemical vapor deposition and sputtering.

(FIG. 4(d))

The silicon oxide film 10 is etched by a known method to provide holes for impurity diffusion, whereupon the polycrystalline silicon film is doped with phosphorus or the like by such a method as ion implantation, to form heavily-doped n-type regions 9 which serve as the sources and drains of the thin-film transistors $Tr_1$ and $Tr_2$. In this case, the thin-film transistors $Tr_1$ and $Tr_2$ become the n-channel type. However, they may well be formed into p-channel type thin-film transistors in such a way that the polycrystalline silicon thin film 8 is doped with an n-type impurity such as phosphorus at the step of FIG. 4(b) and that the source and drain parts thereof are doped with a p-type impurity such as boron and indium.

(FIG. 4(e))

The parts of the silicon oxide film 10 used as a mask for the impurity doping are removed, and a silicon oxide film 10' is formed on the surface of the polycrystalline silicon thin film 8 again.

(FIG. 4(f))

On the major surface of the transparent substrate 6, a transparent electrode 12 of $In_2O_3$, $SnO_2$, a mixture thereof or the like is formed by sputtering or the like. Subsequently, amorphous silicon 11 is formed by the glow discharge decomposition or the like.

(FIG. 4(g))

The silicon oxide film 10' on the major surface of the polycrystalline silicon thin film 8 is provided by etching with contact holes for the source and drain electrodes of the thin-film transistors $Tr_1$ and $Tr_2$.

(FIG. 4(h))

Al or the like is evaporated and then etched, thereby to form a first signal electrode 14, a second signal electrode 15, the gate electrode 17 and source electrode 19 of the imaging thin-film transistor $Tr_1$, and the gate electrode 18 and source electrode 20 of the picture displaying thin-film transistor $Tr_2$.

(FIG. 4(i))

An insulator film 21 of phosphosilicate glass is formed by the chemical vapor deposition. As the insulator film 21, a silicon oxide film, an organic resin layer or the like achieves a similar effect.

(FIG. 4(j))

Al or the like is evaporated and then etched, thereby to form a metal electrode 22 and a scanning electrode 16. In this case, the metal electrode 22 effects the function of applying a voltage to an electrooptic element of liquid crystal or the like and also the function of a reflector plate.

Thereafter, an orientation film 25 is disposed as shown in FIG. 2, and a transparent substrate 7 of glass or the like is provided with a transparent electrode 18 and an orientation film 25. Both the transparent substrates are opposed at a proper interval (5–20 μm), and liquid crystal 24 is injected into the interspace. The resultant structure is sealed by a sealant not shown.

In the present embodiment, picture elements can be formed between a pair of transparent substrates with an imaging portion and a picture displaying portion incorporated. Therefore, the two functions of imaging and picture display can be effected by the single device, and the miniaturization of the device can be achieved.

Also in the present embodiment, the transparent electrode 12 and the source electrode 19 of the imaging thin-film transistor $Tr_1$ occupy the area of the greater part of the picture element except the thin-film transistors $Tr_1$, $Tr_2$ and the wiring lead regions. Accordingly, the area of the light receiving portion of the photoconductor which is provided between the transparent electrode 12 and the source electrode 19 of the imaging thin-film transistor $Tr_1$ occupies a large proportion of the area of the picture element, so that the incident light 31 can be efficiently converted into the picture electric signal.

Moreover, since the metal electrode 22 occupies the area of the greater part of the picture element, the effective area of the picture display is large, and a picture of good quality can be displayed.

That is, in the present embodiment, one surface of the device is used as an imaging surface and the other surface as a picture display surface, so that the imaging and the picture display are permitted without a wasteful area.

Further, in the present embodiment, the scanning electrode 16 is connected to the gate electrodes 17 and 18 of the respective thin-film transistors $Tr_1$ and $Tr_2$ in common, so that the effective areas of the imaging and the picture display become still larger.

In the present embodiment, the thin-film transistors $Tr_1$ and $Tr_2$ have substantially the same shape. Since, however, the electric characteristics of a thin-film transistor can be controlled by the gate length and gate width thereof, it is possible to bring the respective transistors into geometries suitable for desired electric characteristics. The present embodiment has been described as using the polycrystalline silicon for the thin-film transistor as the electronic switching element. Alternatively, amorphous silicon, tellurium, cadmium sulfide or cadmium sulfide may be used. It is also possible to use the so-called silicon-on-sapphire (SOS) obtained by employing sapphire as a transparent substrate and growing a single-crystal silicon film thereon; the so-called silicon-on-insulator (SOI) obtained by forming polycrystalline silicon or amorphous silicon on a quartz substrate and thermally melting it to be turned into a single crystal or polycrystal; or the like.

Figure 5:
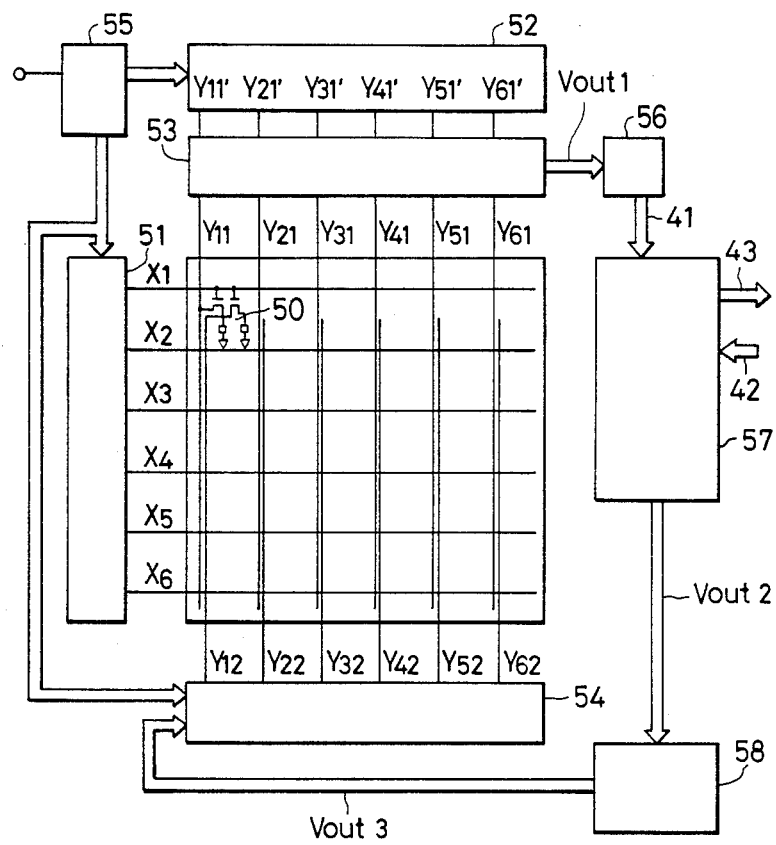
FIG. 5 is a diagram showing the whole arrangement of an embodiment of the imaging display device of the present invention.

FIG. 5 shows the whole arrangement diagram of an embodiment of the imaging display device of the present invention.

Referring to FIG. 5, numeral 50 denotes the single picture element in FIGS. 1 to 3. The picture elements 50 are arrayed in the shape of a matrix of 6 rows and 6 columns, to construct the imaging display device. Numeral 51 indicates a horizontal scanning circuit, numeral 52 an imaging vertical scanning circuit, numeral 53 a vertical picture element switching circuit, numeral 54 a picture displaying vertical scanning circuit, numeral 55 a timing signal circuit, numeral 56 a picture output signal amplifier circuit, numeral 57 a storage circuit such as line memory and frame memory, and numeral 58 an inverter circuit which inverts a picture display signal every field in order to apply an A.C. voltage to the liquid crystal being the electrooptic element. These circuits may be formed by thin-film transistors on the same transparent substrate, or may well be connected from outside.

The storage circuit 57 temporarily stores a signal to be displayed on the picture display portion, and can also be used for merely monitoring pictures in such a way that the pictures to be displayed are switched by switching a picture output signal 41 from the imaging portion and an external picture signal input 42 from a video tape recorder, a television receiver, or the like. Shown at numeral 43 is an output signal for delivering the picture electric signal 41 of the imaging portion to the video tape recorder or the like. Depending upon whether the storage circuit 57 is the line memory for storing the signals of one line or the frame memory for storing the signals of one frame, imaged signals $Y_{11}$, $Y_{21}$, $Y_{31}$ . . . and signals to be written into the picture display portion $Y_{12}$, $Y_{22}$, $Y_{32}$ ... are shifted by one line or one frame, and the latter signals are delivered in timing with signals on the horizontal scanning side $X_1$, $X_2$, $X_3$ ...

Figure 6:
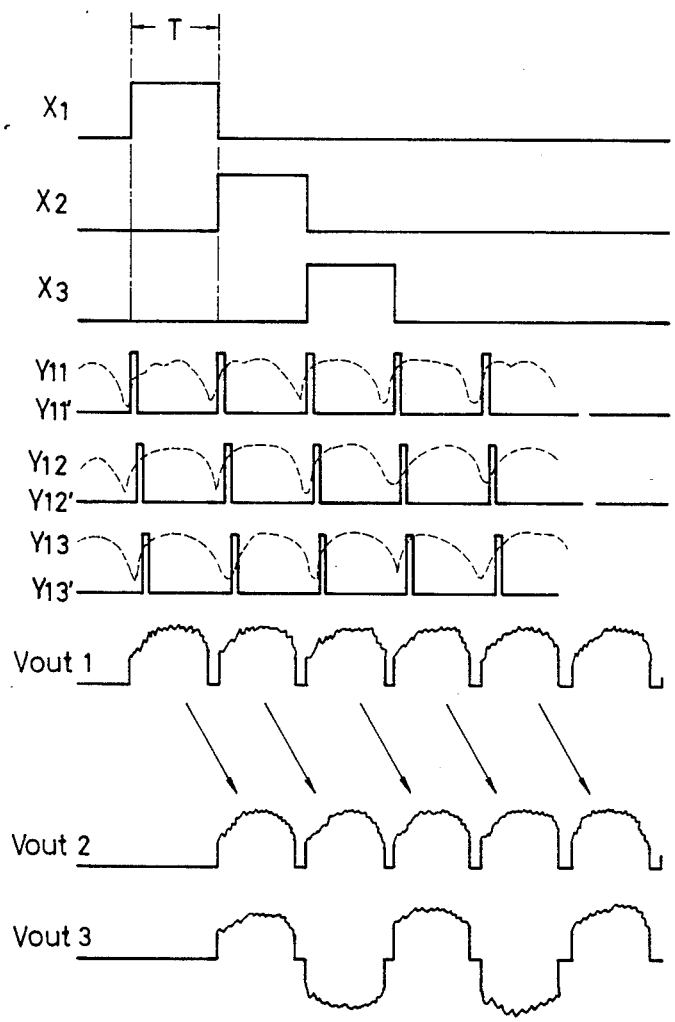
FIG. 6 is a diagram exemplifying the signals of various parts in FIG. 5.

An example of the signals of various parts in FIG. 5 is shown in FIG. 6.

This example corresponds to a case of driving the device by the point sequential scanning. The first row, second row, third row ... are selected by the horizontal scanning signals $X_1$, $X_2$, $X_3$ ... During the period of time T during which one line is selected, the first column, second column, third column ... are selected by vertical scanning signals $Y_{11}'$, $Y_{12}'$, $Y_{13}'$ ... The voltages $Y_{11}$, $Y_{12}$, $Y_{13}$ ... to be delivered from the imaging portion are derived by the timings of these signals, whereby a picture output signal $V_{out1}$ is obtained. The signal $V_{out1}$ is stored in the line memory 57 by way of example, and is outputted with a delay corresponding to one line. Then, a signal $V_{out2}$ is obtained. By inverting the sign of this signal every field, a signal $V_{out3}$ is obtained. The signal $V_{out3}$ applies A.C. to the liquid crystal layer so as to prevent the liquid crystal from deteriorating. In order to apply the signal $V_{out3}$ to the liquid crystal, a line sequential scanning method or point sequential scanning method which is known can be resorted to.

Here in the present embodiment, there has been described the case where the point sequential scanning is employed for deriving the picture output signal $V_{out1}$. However, the line sequential scanning is also possible by establishing a circuit arrangement in which a line memory is provided on the signal scanning side.

The storage circuit 57 in FIG. 5 serves to bring the timings of the picture output signal $V_{out1}$ and the picture display signal $V_{out2}$ into agreement. When it is constructed of a line memory for storing picture signals of n rows, the picture output signal $V_{out1}$ and the picture display signal $V_{out2}$ come to shift by n rows. In addition, when a frame memory for storing signals corresponding to one frame is used as the storage circuit 57, the signals $V_{out1}$ and $V_{out2}$ shift by one frame. Such selection of the storage circuit can be readily changed in the present invention.

As set forth above, according to the present invention, peripheral circuits and wiring leads are reduced, and an imaging display device well-suited to the miniaturization thereof can be provided.

I claim:

1. An imaging display device comprising a pair of transparent substrates which are arranged in opposition to each other with a predetermined interval therebetween, photoelectric elements which are disposed in a large number between said substrates and in adjacency to one of said substrates and which convert light signals from outside said one substrate into electric signals, at least one first electronic switching element which is provided on one of said pair of substrates and one main terminal of which is connected to the photoelectric element, a vertical scanning circuit for imaging which is connected to the other main terminal of said first electronic switching element, a large number of liquid crystal electrooptic elements which are disposed between the other substrate and the respective photoelectric elements and in a predetermined relationship of correspondence with said photoelectric element and which generate light signals by utilizing parts of the electric signals of the corresponding photoelectric elements, at least one second electronic switching element which is provided on one of said pair of substrates and one main terminal of which is connected to the liquid crystal electrooptic element, a vertical scanning circuit for picture display which is connected to the other main terminal of said second electronic switching element, a horizontal scanning circuit which is connected to cotnrol terminals of said first and second electronic switching elements, and a storage circuit which stores the signal to be displayed, where the pictures to be displayed are switched by switching the electric signal from said vertical scanning circuit for imaging and an external picture signal, and an inverter circuit which inverts the signal to be displayed from said storage circuit every field in order to apply an A.C. voltage to the liquid crystal electrooptic element.

2. An imaging display device according to claim 1, wherein said photoelectric elements are formed of hydrogenated amorphous silicon.

3. An imaging display device according to claim 1, wherein said electronic switching elements are thin-film transistors.

4. An imaging display device according to claim 3, wherein a gate electrode of at least one thin-film transistor for driving the photoelectric element and a gate electrode of at least one thin-film transistor for driving the electrooptic element are connected in common.

5. An imaging display device according to claim 1, wherein said imaging vertical scanning circuit, said picture displaying vertical scanning circuit and said storage circuit are provided on one of said pair of substrates.

6. An imaging display device according to claim 1, wherein said storage circuit is a line memory.

7. An imaging display device according to claim 1, wherein said storage circuit is a frame memory.

* * * * *